US007318700B2

United States Patent
Sugg

(10) Patent No.: US 7,318,700 B2
(45) Date of Patent: Jan. 15, 2008

(54) SPIRAL PERTAINING TO A TURBO-MACHINE

(75) Inventor: Josef-Michael Sugg, Hohentengen-Ölkofen (DE)

(73) Assignee: VA Tech Hydro GmbH, Vienna (AT)

( * ) Notice: Subject to any disclaimer, the term of this patent is extended or adjusted under 35 U.S.C. 154(b) by 0 days.

(21) Appl. No.: 10/994,031

(22) Filed: Nov. 15, 2004

(65) Prior Publication Data

US 2005/0169751 A1 Aug. 4, 2005

Related U.S. Application Data

(63) Continuation-in-part of application No. PCT/EP03/04619, filed on May 2, 2003.

(51) Int. Cl.
*F03B 3/02* (2006.01)
(52) U.S. Cl. .................................... 415/205; 415/215.1
(58) Field of Classification Search ........ 415/204–206, 415/184, 212.1, 215.1, 902; 428/586, 592, 428/599
See application file for complete search history.

(56) References Cited

U.S. PATENT DOCUMENTS 1,309,809 A * 7/1919 Pfau ........................... 415/184
1,483,995 A   2/1924 Taylor
1,526,917 A   2/1925 Leland
1,728,906 A * 9/1929 Muth .......................... 415/205
1,762,121 A   6/1930 Gross
2,994,348 A * 8/1961 Cape ....................... 415/215.1
4,720,240 A   1/1988 Bronowski

FOREIGN PATENT DOCUMENTS

| CH | 571 160 | 12/1975 | | |
|---|---|---|---|---|
| DE | 1 258 360 | 1/1968 | | |
| DE | 30 08 554 | 9/1981 | | |
| DE | 35 01 883 | 8/1986 | | |
| JP | 54-19033 A | * | 2/1979 | .............. 415/215.1 |
| JP | 55-148975 A | * | 11/1980 | .............. 415/215.1 |
| JP | 62-129576 A | * | 6/1987 | ................. 415/205 |

* cited by examiner

*Primary Examiner*—Richard A. Edgar
(74) *Attorney, Agent, or Firm*—Nixon & Vanderhye P.C.

(57) ABSTRACT

A spiral for a turbomachine including reinforcing sheets which are partially located in the transition region between the spiral and parallel plate.

20 Claims, 2 Drawing Sheets

SPIRAL PERTAINING TO A TURBO-MACHINE

CROSS-REFERENCE TO RELATED APPLICATION

This application is a continuation-in-part of PCT International Application No. PCT/EP03/04619, filed May 2, 2003, which claims priority of Austrian application number 752/2002, filed May 16, 2002. The entirety of this application is hereby incorporated by reference.

BACKGROUND OF THE INVENTION

The invention relates to a spiral pertaining to a turbomachine, the spiral having a number of interconnected segments and at least one parallel plate, and also relates to a use of such a spiral in a water power station.

The spirals of turbomachines, such as turbines, pumping turbines or pumps, are formed, as a rule, from individual segments welded to one another. In this case, the spiral becomes the more beneficial in terms of stress and flow, the more segments are provided. On the other hand, the more segments are provided, the more costly a spiral becomes. For this reason, spirals are manufactured, instead, with fewer segments, the stress peaks which occur at the transitions of the spiral to the parallel plate being absorbed by corresponding sheet metal thicknesses of the spiral skin. Flow-related disadvantages are in this case taken into account.

SUMMARY OF THE INVENTION

The object of the present invention, then, is to provide a spiral which makes it possible to use thinner metal sheets for the spiral and at the same time improve the spiral in terms of flow.

This object is achieved, according to the invention, in that a reinforcing sheet, which forms part of the casing of the spiral, is arranged at at least one connecting joint of two segments of the spiral and/or in the region of the transition of the spiral to the parallel plate.

Owing to the reinforcing sheet in the region of the transition, the spiral becomes more beneficial in terms of stress, and the stress peaks are reduced, with the result that thinner sheets can be used for the spiral itself. In practice, therefore, it was possible to achieve a reduction in the weight of a spiral of up to 10%, which is also reflected correspondingly in the production costs.

Moreover, the reinforcing sheets give rise to a less pronounced deflection of the liquid medium in a spiral, the consequence of this being that the flow contour in the spiral is improved.

An especially stress-reducing and flow-improving embodiment is obtained when the reinforcing sheet is of triangular design.

The reinforcing sheets are in this case advantageously used in such a way that, by virtue of the reinforcing sheet, the inner contour of the spiral is essentially preserved, thus improving the flow contour of the spiral due to the gentler deflections which occur. Consequently, the flow losses decrease and the efficiency is improved.

For reasons of efficiency and of cost, the reinforcing sheets are arranged only in the region of the spiral having the largest diameters, since the highest loads occur there and the reinforcing sheets can therefore also exert the greatest effect.

Since the loads occur essentially symmetrically about the mid-plane, beneficially at least one reinforcing sheet is arranged in each case on both sides of the transitions to the parallel plate.

A spiral according to the invention can be manufactured in a simple way by the segments being welded together and by the reinforcing sheets being welded into recesses of the spiral or by the reinforcing sheets being welded on.

For safety reasons, the locations on the spiral which are subjected to the highest load are left partially free in order to allow subsequent checks of these locations. This, then, is no longer necessary, since the stress level is lowered due to the reinforcing sheets, but, instead, the outer face of the spiral can be concreted in completely in the region of the reinforcing sheets, and this may considerably simplify the design of a water power station.

A spiral a turbomachine, the spiral comprising: a plurality of spiral segments arranged around a longitudinal axis of the spiral, the segments being hollow shapes in cross-section and each including an attachable region including a transition; each segment having opposite end faces and adjacent segments being interconnected at their opposing end faces; at least one parallel plate radially inward of the segments and to which the segments are connected at the transition; a reinforcing sheet, which forms part of a casing of the spiral and is arranged in the region of the transition of the spiral to the parallel plate, the reinforcing sheet connecting the spiral with the parallel plate in the direction of the longitudinal axis of the spiral and providing only a part of the connection at the transition. In the spiral, reinforcing sheet is shorter in the direction along the parallel plate than the transition from a segment to the plate. whereby the reinforcing sheet extends along part of the length of the connection of the transition to the plate. The spiral may be used as the spiral of a turbine or pumping turbine in a water power station including at least one turbine or pumping turbine, with a spiral feed of liquid medium and a generator.

Other features and advantages of the present invention will become apparent from the following description of the invention which refers to the accompanying drawings.

BRIEF DESCRIPTION OF THE DRAWINGS

The present invention, then, is described with reference to the exemplary, diagrammatic and nonrestrictive FIGS. 1 to 3 in which.

DESCRIPTION OF A PREFERRED EMBODIMENT

Figure 2:
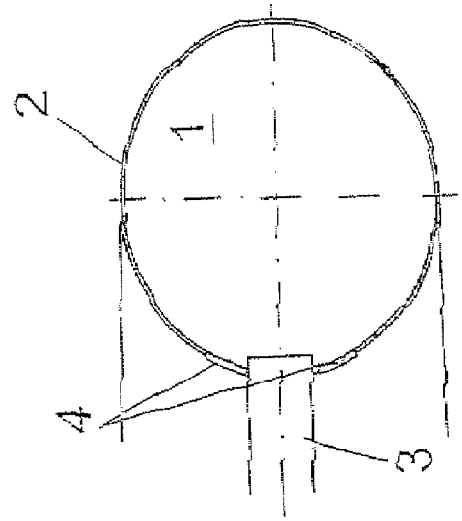
FIG. 2 shows a cross section through the spiral with a parallel plate, FIG. 3 schematically illustrates a water power station in which the spiral of the invention may be used.
Figure 1:
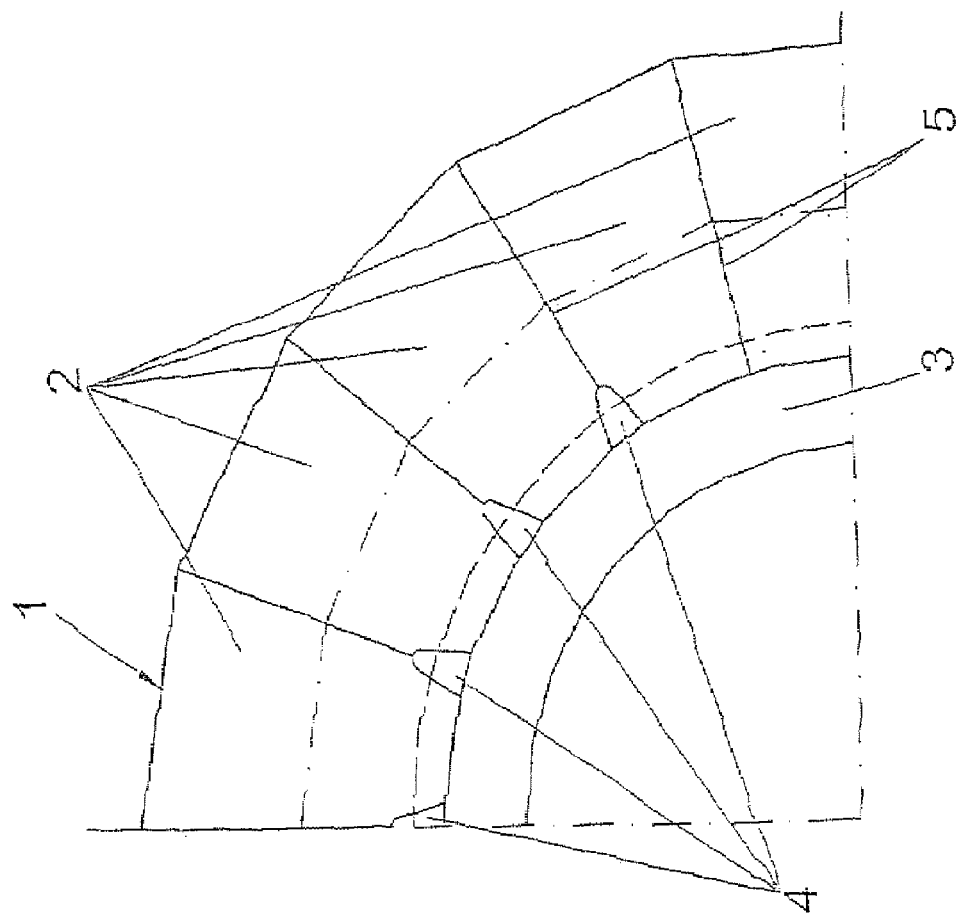
FIG. 1 shows part of a spiral with reinforcing sheets according to the invention.

FIG. 1 shows a detail of a spiral 1 pertaining to a turbomachine, such as, for example, a Francis turbine, a pumping turbine or a pump. The spiral has a plurality of segments 2 for manufacturing reasons. As seen in the example of FIG. 2, the segments may be hollow and may be rounded in shape, in cross-section. In this exemplary embodiment, the segments 2 are welded to one another along the segment joints 5. The segments of the spiral 1 are welded at their radially inward regions to a parallel plate 3, to which other components of the turbomachine, such as a turbine cover, the guide wheel ring, etc., can be flanged.

Supporting blades sufficiently known, but not illustrated here, or other suitable connection elements, such as spacer stays, etc., could likewise also be arranged between an upper and a lower parallel plate 3.

In the region of the spiral 1 having the largest cross-sectional diameters, that is to say where the highest loads occur, then, reinforcing sheets 4 are arranged in the region of intersection of the segment joints 5 with the parallel plate 3, that is to say in the region in which the highest stresses and loads normally occur. The reinforcing sheets 4 are of triangular design here and are welded in recesses in the casing of the spiral 1, so that the bottom side of the triangle is connected to the parallel plate 3 and the two sides of the triangle converge at the segment joint 5 into a rounded vertex.

The shape of the reinforcing sheet is, of course, not restricted to a triangle, but any other desired shapes, such as, for example, an elliptic or oval reinforcing sheet, may also be envisaged. The reinforcing sheet is shorter in the direction along the parallel plate than the transition from a segment to the plate, whereby the reinforcing sheet extends along part of the length of the connection of the transition to the plate.

As may be gathered from FIG. 2, the circular inner contour of the spiral is essentially preserved. Of course, for flow-related or stress-induced reasons, the inner contour could be varied by means of the reinforcing sheets 4, for example the selected radius of the reinforcing sheet 4 could be somewhat greater than the inner spiral radius.

The reinforcing sheet 4 is thicker here than the rest of the spiral 1 or, expressed more pertinently, due to the stress-reducing effect of the reinforcing sheets 4, the selected sheet thickness of the spiral 1 may be thinner than hitherto, thus affording a considerable weight saving of the spiral 1.

In this exemplary embodiment, a reinforcing sheet 4 is used on both sides of the parallel plate 3.

As may be gathered from FIG. 1, with regard to the parallel plate 3, the number of segments is doubled by the reinforcing sheets 4, since the reinforcing sheet 4 actually functions as a segment in the region of the parallel plate 3. As a result, the opening angle of the individual segments is reduced, thus leading, in turn, to lower stress peaks. Furthermore, the reinforcing sheets 4 also have an advantageous effect in terms of flow, since the reduced deflection of the medium reduces the risk of the breakaway of the medium from the spiral skin, the flow contour thus being improved.

The above statements refer only to inserted reinforcing sheets, but, of course, it may also be envisaged to weld reinforcing sheets onto the casing of the spiral at the appropriate locations, preferably on the outside, which would exert essentially the same effect.

Owing to the stress-reducing effect of the reinforcing sheets, it is in this case no longer necessary to leave these locations of the highest loads free when the spiral is concreted in, in order to make subsequent checks possible, but, instead, the entire spiral may be concreted in, if required, and this, of course, simplifies the construction of a water power station in which the spiral of the invention may be used. For safety reasons, however, these locations could, of course, be kept free, as before, if required.

Figure 3:
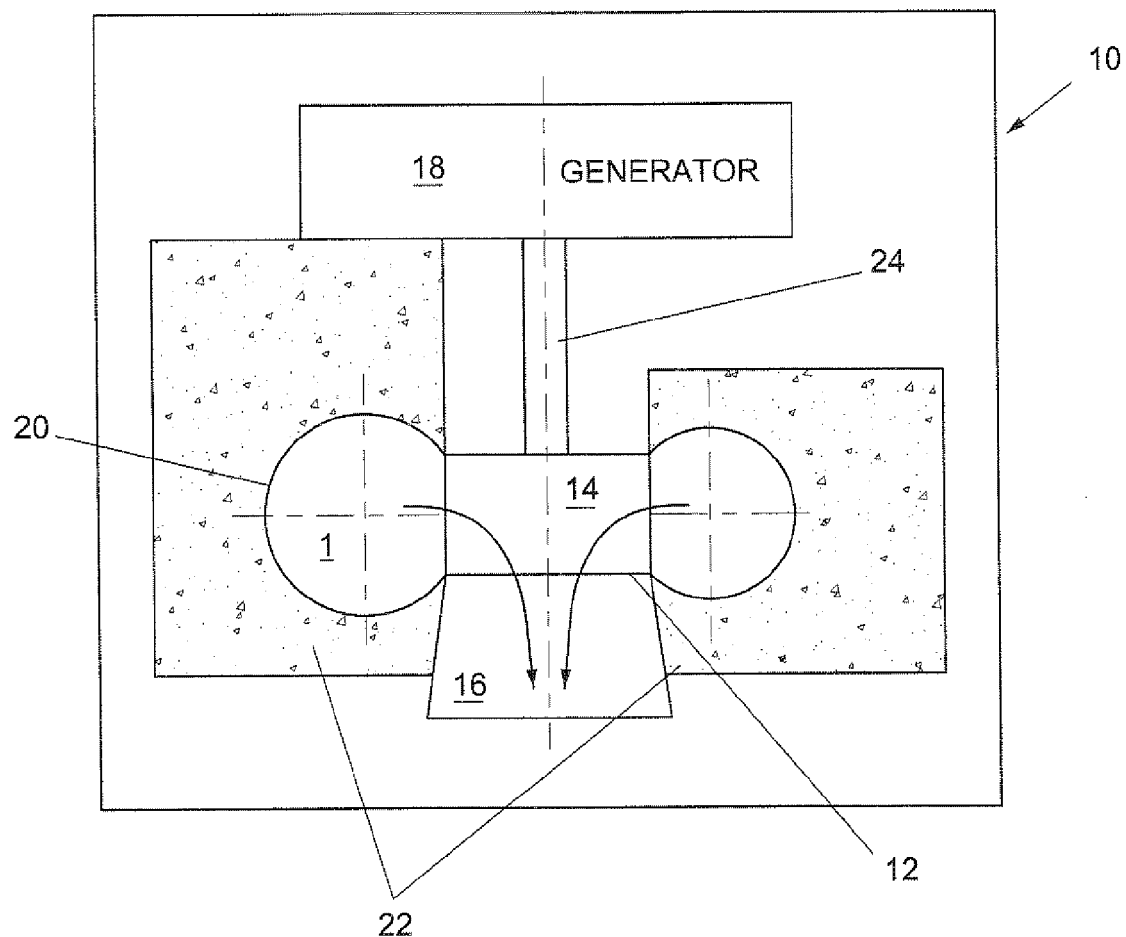

FIG. 3 schematically illustrates a water power station 10 including a turbine 12 with a turbine runner 14, e.g. a Francis type turbine, including a spiral 1 according to the invention which is a spiral feed of a liquid medium. The spiral 1 conventionally includes a not shown inlet and an outlet 16 for liquid medium to be transferred from the inlet to the turbine runner 14 via the spiral 1 and the outlet 16, as indicated in FIG. 3 by the arrows. The turbine runner 14 and the generator 18 are arranged on a shaft 24 and the turbine runner 14 drives the generator 18 for generation of electrical energy. Such an arrangement is well known to a person skilled in the art. The spiral 1 has an outer face 20 on the exterior thereof at which the spiral 1 is concreted into the water power station 10. The spiral 1 is completely surrounded by concrete 22 at least in the region of the reinforcing sheets.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A spiral for a turbomachine, the spiral comprising:
a plurality of spiral segments arranged around a longitudinal axis of the spiral, the segments being hollow and each segment including an attachable region having a transition;
each segment having opposite end faces and adjacent segments being interconnected at their opposing end faces;
at least one parallel plate radially inward of the segments, wherein the transitions of the segments are connected to the parallel plate;
a reinforcing sheet forming part of a casing of the spiral and arranged proximate to the transition of at least one of the segments, the reinforcing sheet connecting the segment with the parallel plate in a direction of the longitudinal axis of the spiral and providing only a part of a connection to the plate at the transition, wherein the reinforcing sheet is shorter than the transition in a direction along the parallel plate and the reinforcing sheet extends along a part of the connection between the transition and the parallel plate.

2. The spiral of claim 1, wherein the reinforcing sheet is attached adjacent transitions of a pair of interconnected segments.

3. The spiral as claimed in claim 1, wherein the reinforcing sheet is of triangular shape.

4. The spiral as claimed in claim 1, wherein the spiral has an inner contour at the transition, and the reinforcing sheet is shaped and positioned to conform to the inner contour of the spiral.

5. The spiral as claimed in claim 1, further comprising a plurality of the reinforcing sheets, wherein each sheet in bridges the transitions of a pair of the interconnected segments.

6. The spiral as claimed in claim 1, wherein the casing extends away from the at least one reinforcing sheet and the reinforcing sheet is arranged on opposite sides of the transitions of the spiral to the parallel plate.

7. The spiral as claimed in claim 1, wherein each of the segments is welded to adjacent ones of the segments at the opposing end faces of the segments.

8. The spiral as claimed in claim 1, wherein the spiral has an outer surface defining a casing and the reinforcing sheet is welded onto an outer surface of the casing.

9. The spiral as claimed in claim 1, wherein each of the segments has a partially circular shape in cross-section.

10. The spiral as claimed in claim 9, wherein the spiral has an outer face which is encased in concrete at least near the reinforcing sheets.

11. The spiral as claimed in claim 1, wherein the attachable region of each of the segments is a radially inward region thereof.

12. A water power station including at least one turbine or pumping turbine, with a spiral feed of the liquid medium and a generator, the spiral of the turbine or pumping turbine being the spiral as in claim 1.

13. A spiral for a turbomachine, the spiral comprising:
a plurality of spiral segments around a longitudinal axis of the spiral, the segments being hollow and each segment including an attachable region with a transition;
each segment having opposite end faces and adjacent segments being interconnected at their opposing end faces;
at least one parallel plate radially inward of the segments and the plate connected at the transitions to the segments;
a reinforcing sheet forms part of a casing of the spiral, is arranged proximate to the transition of the segment, connects the segment to the parallel plate in a direction of the longitudinal axis of the spiral, and provides only a part of the connection at the transition,
wherein the spiral has a recess toward the plate, and the reinforcing sheet is welded into the recess of the spiral.

14. A spiral for a turbomachine, the spiral comprising:
a plurality of hollow spiral segments arranged around a longitudinal axis of the spiral, the segments each include a radially inward edge for attaching to a parallel plate and a transition section adjacent the radially inward edges;
each segment having opposite end faces, wherein adjacent segments are interconnected at their respective opposing end faces;
at least one parallel plate radially inward of the segments and connected to the radially inward edges of the segments;
a reinforcing sheet bridging the transition sections of a pair of the interconnected segments, the reinforcing a joint between the segment and the parallel plate, wherein the reinforcing sheet has a length along the parallel plate which is shorter than a length of either of the transition sections bridged by the reinforcing sheet.

15. A spiral as in claim 14 wherein the reinforcing sheet conforms to an outer surface of the segments to which it is attached.

16. A spiral as in claim 14 wherein the reinforcing sheet is wide adjacent the radially inward edge of the segment and tapers as the sheet extends along the segment in a direction perpendicular to the plate.

17. A spiral as in claim 14 wherein the reinforcing sheet is mounted symmetrically about a joint between the interconnected segments.

18. A spiral as in claim 14 wherein the reinforcing sheet is seated in a recess in outer surfaces of the interconnected segments.

19. A spiral as in claim 14 wherein at least a pair of reinforcing sheets are mounted symmetrically on the segments along a line perpendicular to the plate.

20. A spiral as in claim 14 wherein the reinforcing sheet has a triangular shape and an apex of the sheet is on an interconnection between segments.

* * * * *